United States Patent
Masso Remiro

[11] 3,892,239
[45] July 1, 1975

[54] QUINOHYDROTHERMIC BODY COVERING ELEMENT

[76] Inventor: Jose Ma Masso Remiro, Ganduxer, 10-12 5° 1", Barcelona, Spain

[22] Filed: Nov. 13, 1973

[21] Appl. No.: 415,396

[30] Foreign Application Priority Data
Nov. 23, 1972 Spain .................................. 196410
Oct. 2, 1973 Spain .................................. 195808

[52] U.S. Cl. .................................. 128/293; 128/165
[51] Int. Cl. .................................. A61f 7/00
[58] Field of Search .......... 128/165, 155, 157, 293, 128/60, 82.1, 93

[56] References Cited
UNITED STATES PATENTS

| | | | |
|---|---|---|---|
| 2,065,191 | 12/1936 | Loeber | 128/60 |
| 2,909,176 | 10/1959 | Ashe | 128/293 |
| 3,529,601 | 9/1970 | Kirkland | 128/155 |
| 3,613,681 | 10/1971 | Adams | 128/293 |

Primary Examiner—Richard A. Gaudet
Assistant Examiner—Henry S. Layton
Attorney, Agent, or Firm—Wenderoth, Lind & Ponack

[57] ABSTRACT

A Quinohydrothermic Body Covering Element is made from a stratified material which comprises a thin layer of rubber, having an essentially laminar construction, and the section of which decreases progressively in one of the directions thereof. The layer is non-porous, highly elastic and is closely contacted at one surface thereof with a layer of knitted fabric which covers such one surface which has a crenelated cross section towards the exterior, and the other surface of which can optionally be covered by a second layer of knitted fabric.

6 Claims, 6 Drawing Figures

QUINOHYDROTHERMIC BODY COVERING ELEMENT

BACKGROUND OF THE INVENTION

The present invention refers to a body covering element capable of producing beneficial modifications, of the physico-chemical and mechanical type, of the organism of a patient when the organic function of the skin is controllably altered.

SUMMARY OF THE INVENTION

The body covering elements to which the invention is directed have a stratified structure, which comprises a fine layer of rubber essentially laminar in construction, but having a thickness decreasing progressively in one direction of the element. Such layer is non-porous, highly elastic and is intimately associated with another layer which is of knitted fabric which covers one of the surfaces of the elastic layer and which has a crenelated cross section. The elastic layer may be optionally covered on its other surface with a second layer of knitted fabric.

According to the present invention, a covering element having these characteristics should be able to be situated on a limb or other part of the body, so that the element can positively and efficiently influence the functional behaviour of the skin.

Consequently, the covering element can be formed in various specific shapes, as long as such shaped elements have the fundamental arrangement described above.

Two embodiments of specific shapes, which are considered of major interest, emphasizing modifications of secondary nature which, in each case, should be introduced in the overall arrangement, will be described below.

One of these specific shapes of modes is that of a tube which is narrower at one end than at the other, the progressive change in section of this tube and its dimensions in general being suitable to be perfectly adapted to the part of the body to be covered. The rubber layer is thicker at the narrowest end of the tube, the thickness decreasing progressively towards the other end, and at least one of the knitted strips, which should be without seams, to form the tube, is crenelated in such a way that its free internal surface has a plurality of equidistant and parallel lineal ribs or protuberances, axially oriented with respect to the tube, the active edges of which are capable of gripping and transverse deformation.

The other preferred mode is that of an enlarged strip, which can be used as a bandage, wherein the ribs of the knitted fabric extend transversally of the longitudinal dimension of the bandage, and wherein the rubber layer covers the knitted fabric at the face thereof opposite the ribs. Thus the element can in turn be covered by another layer of knitted fabric, as in the previous case. The rubber layer has a maximum thickness at one of the ends of the bandage, such thickness decreasing to the other end.

BRIEF DESCRIPTION OF THE DRAWINGS

The structural characteristics of the element and its form of application can be better understood by means of the following description taken with the accompanying drawings in which.

DETAILED DESCRIPTION OF THE INVENTION

Figure 2:
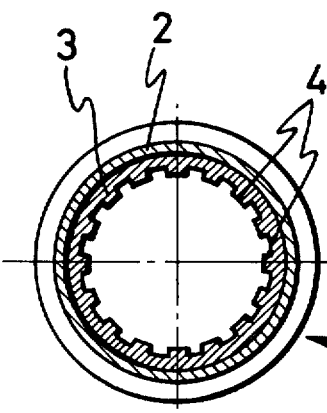
FIG. 2 represents a transversal section of the element, taken along lines II—II in FIG. 1.
Figure 1:
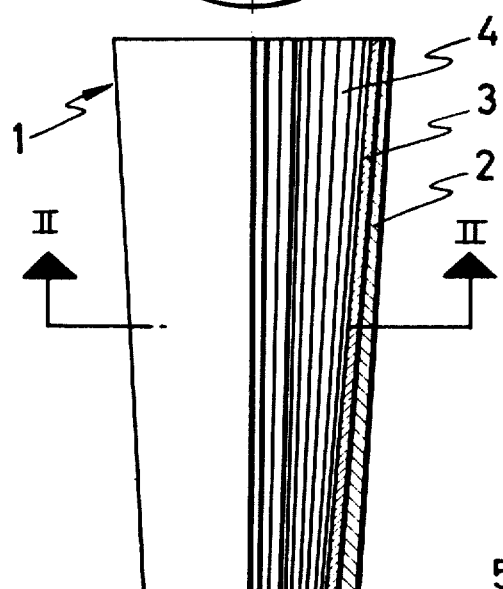
FIG. 1 represents a side elevational view, in quarter section, of a covering element made in accordance with the invention and according to one modes thereof.
Figure 3:
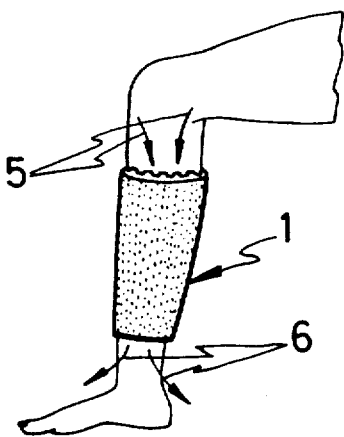
FIG. 3 represents an example of applying the element to a leg.

With reference to FIGS. 1 to 3, it can be seen that the element, designated in general with numerical reference 1, is constituted by a tube 3 of knitted fabric, one end of which is narrower than the other and which has, interiorly thereof, a plurality of equidistant linear protuberances of ribs 4 axially oriented with respect to the tube and which form therebetween a plurality of intermediate channels.

It can also be seen that tube 3 is exteriorly covered with a fine layer 2 of highly elastic material, such as rubber, which is thicker at the end corresponding to the narrowest mouth of the knitted tube, and the thickness of which decreases progressively towards the other end of the tube and which can be exteriorly covered with another layer of knitted fabric, which however is not illustrated for purposes of clarity.

The continuity, elasticity and nonporosity of the sheet of rubber 2, and the existence of the channels or spaces which are formed between the internal ribs 4 are specific and fundamental characteristics of the invention. In FIG. 3, there is represented an example of application, showing in principle the manner in which the layer of rubber contributes to the efficient holding and isolation of the part of the body being treated and the manner in which the channels allow controlled circulation of air, as shown by arrows 5 and 6.

Figure 5:
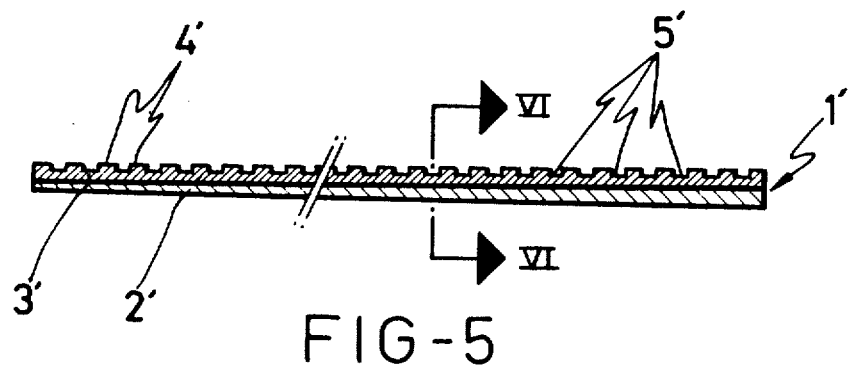
FIG. 5 represents a longitudinal section of the element, taken along lines V—V in FIG. 4.
Figure 4:
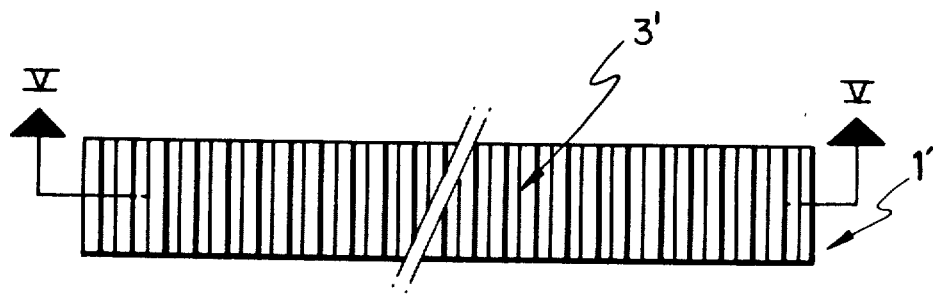
FIG. 4 represents an upper plan view of an element in accordance with a second mode of the invention.
Figure 6:
FIG. 6 represents a cross section of the element, taken along lines VI—VI in FIG. 5.

Now with reference to FIGS. 4 to 6, a second mode of the invention is a bandage having a basic structure which corresponds to that described above. That is, the general form of bandage 1', is a strip composed of a sheet of knitted fabric 3', one of its surface having an association of parallel equidistant emerging protuberances or ribs 4', while the opposite surface attached therefor a fine layer 3' of non-porous, elastic material, such as rubber which has a great recuperation power. This layer of rubber, in turn, can be externally covered with knitted fabric, in order to improve its appearance, without varying the functional behaviour of the assembly.

As seen in the drawings, the ribs 4' of the sheet of knitted fabric 3' form channels 5' between each other, and in accordance with this embodiment, they are transversally with respect to the longitudinal dimension of the bandage, while the layer of rubber 2, the thickness of which progressively varies throughout the entire length of the bandage, reaches its maximum dimension at one of the ends of the bandage.

With this arrangement, when a limb or any other part of the body of the user is bandaged, the ribs 4', as a result of the wrapping of the bandage around the body, enfolding the same, are longitudinally arranged with respect to the body. This is the reason why the channels 5', formed between the nerves 4', are open towards the upper and lower edges of the bandaged area.

As in the first embodiment the channels 5' constitute spaces in the interior of the bandage.

These spaces, combined with the layer of rubber situated on the exterior, which acts as an isolation and holding or supporting element, give rise to thermotherapeutic, hydrotherapeutic, surface protection, electrophysiological, quinesiotherapeutic and reanimating effects. The combination of these structural features is of great importance both for the elimination of superfluous fats, as well as for the treatment of abnormalities, such as cellulitis, and sicknesses such as psoriasis and ichthyosis. Independently of this, and due to the supporting effect achieved by the layer of external rubber, the element serves to correct postures, either in the orthopaedic field, or in certain athletic and professional activities, where violent movement and prolonged efforts are required.

However, before describing in detail the qualities which can be applied to Medicine, from the preventive-therapeutic point of view, of the element of the present invention, it should be emphasized that the skin protects the human body from mechanical affronts due to the hardness and smoothness of the corneum layer, due to the elastic pad or cushion which the subcutaneous cellular tissue represents, and above all due to the elastic properties of the skin itself, i.e., the ability of deformation under the action of external mechanical stimuli and instantaneous recovery of the former shape as soon as the action causing such deformation ceases. This property is related to the fibrillar structure of the skin (connective and elastic fibres).

In order to completely understand the physiological role of the skin, it is necessary to consider the same, not as an isolated organ, but as a functional apparatus serving the entire organism. The skin is an essential factor in homeostatis, that is, within certain ranges it maintains the biological constants within which life moves.

Any variation or alteration in the cutaneous surface can favourably or unfavourably influence upon the entire organism.

A. PROPERTIES AND MECHANISM OF ACTION

Basing on the structure of the element proposed by the invention, the following properties and actions can be attributed thereto:

1. Thermotherapeutic effect

The skin presents a physiological hypothermy when compared with the internal temperature. If it is covered with an impermeable material in which there are spaces constituting the channels which are interiorly formed between the nerves, the air, which immediately surrounds the cutaneous surface in a thin layer and when in continuous contact and when remaining stable for a longer period of time, heats, moistens and favours the gaseous interchange of carbonic anhydride and oxygen, since the accumulated air will slowly flow towards the upper and lower parts, renewing itself, but will not cool the internal parts. This increase in local surface temperature will irradiate towards the internal medium, this heat directly influencing the lowermost subcutaneous and muscular planes, indirectly producing an increase in the dermal capillar circulation, the permeability of which makes the substances dissolved in the blood plasma pass to the tissues and circulate between their cells, probably in the form of a colloidal solution, which replaces the cellular products and collects the residues of the metabolism, by physio-chemical changes established in the cellular colloid. The intracellular circulation is the only one existing in the epidermis.

2. Hydrotherapeutic effect

This is based on the increase of the sweat secretion by thermal stimulus of the heat. It allows elimination of a larger part of water, of electrolytes (sodium chloride) and metabolites, and due to its chemical composition, acidifies the pH of the cutaneous stratum. This sweating is eliminated by evaporation through the openings in the garment.

3. Surface protection effect

This is essentially connected to the epicutaneous emulsified layer comprised by two non-miscible liquid phases. The water of the imperceptible perspiration and of the sweat constitute the aqueous phase. The lipids of the sebaceous secretion, form the principle contingent of the oily phase. When this emulsified layer increases, it favours the loss of cellular water and a protecting layer is formed. This layer covers the cutaneous surface homogenously in the same way as a cream, giving the skin greater resistance, elasticity, plasticity and softness.

4. Electrophysiological effect

The corneum layer has a high electrical resistance which can be diminished by means of a mechanical stimulus, such as a massage. This effect is very important since it increases the epidermic permeability.

The cutaneous surface has a negative charge as previously indicated.

5. Quinesiotherapeutic effect

The constitution of the rubber which forms part of the covering elements, its great elasticity, resistance and easy recuperation, gives rise to the fact that with movements of the normal body a type of light, smooth massage is produced, with constant "massaging" of the subcutaneous and muscular planes, favouring the adipose micronization and, therefore, the elimination of the neutral fats, through vascular and lymphatic circulation, as well as consumption of calories on the part of the muscular tissue, which can use the fat reserve, in the absence of glucides, with the resultant decrease in adipose tissue.

The increase in blood flow which produces a larger and better oxygenation of the tissues should not be forgotten.

6. Reanimation effect

This can be effected by means of physicochemical mechanisms, with elimination of the toxic products formed during cellular metabolism (muscular lactic acid) and by the increase in the gaseous oxygencarbonic anhydride interchange, when influencing the dermal capillar circulation and the sweating and sebaceous external secretions, as well as by the physical effect when exercising a slight pressure on the cutaneous surface which is transmitted to the internal medium, giving rise to a better holding of the organs situated in empty spaces and to a better functioning of same.

The psychological factor which could be exercised on the person, when noticing the comfort of a garment having the qualities indicated, should not be forgotten.

7. Increase in resistance of the supporting tissues

The striated muscles and articulate ligaments form the supporting framework of the skeleton and, therefore, of the human body. Their action is based on the resistance and elasticity of their fibres. There is no doubt that by adding thereto an external strength which favours their contradictions and diminishes their stretchings, at the same time as it favours their functional recuperation, the energetic waste will be far less and the risks of possible fibrillae breakages, due to increase in their resistance, will also be less.

In the sporting and professional fields, where violent movement and prolonged effort are required, this fact is fundamental, and it can be said that a greater athletic and productive yield can be produced.

8. Postural correction

It is a sufficiently well known fact that any alteration in the position of the vertebral or articular column, can give rise to a series of organic deficiencies or pathological postures (ciphosis, lardosis, scoliosis, etc.), as well as to a general indisposition tiredness, fatigue, etc., which is overcome by means of correcting mechanisms, such as an elastic garment which exerts a constant and uniform pressure and which garment is adaptable to various movements without impeding its free action.

Having cited the different and perculiar effects which the covering elements of the present invention produce, it can be insinuated that the denomination of HYDROTHERMIC garments fits in with the functions which they carry out on the human body.

PREVENTIVE-THERAPEUTIC APPLICATION AND UTILIZATION

Departing from the mechanisms, properties and effects enumerated previously, a search has been made for a series of useful and practical applications for these garments within the medical, athletic and labor preventive and therapeutic fields.

Due to the peculiar hydrothermic effects, their possibilities in PSORIASIS, an illness of unknown cause, of chronic evolution and rebellious to all therapeutics used, were investigated. Presently, psoriasis is still a real obsession both for the sick person as well as for the dermatologist, and any suggestion or possible improvement of its treatment is received with the greatest of pleasure.

Twelve persons suffering from PSORIASIS were observed and controlled. The persons used different garments made in accordance with the structure described (girdle, and stockings), on different parts of the body and one patient was equipped with a complete garment (jacket and trousers) hermetically closed. The garments were generally used for 12 hours and corticoidea creams were applied to some areas in order to appreciate their different effects.

It should be pointed out that after a term of two weeks a remarkable reduction in scales was seen and after three or four weeks a complete whitening in some patients. Even though the control was short (two weeks), it can be affirmed that the results were frankly surprising, since, although it is not a curing system, and relapses occurred, it permits a control of the illness, it is indeed more economical than any other treatment with inocuous local topics (this fact already justifies its use), it is well withstood (no complications), and it can be considered as a variant of the occlusive cures used in dermatoloy, with the advantage that it is more practical and better withstood.

There is no doubt that in other cutaneous pathological processes such as ICHTHYOSIS, which benefit from heat and external cutaneous secretions, the invention can likewise be applied.

The use of this invention in what is known as CELLULITIS (cutaneous illness characterized by a non-inflammatory "pasting" of the subepidermal zones, with an increase in their thickness, reduction in their movement, painful sensation and a granulous, indured epidermic surface, such as an orange skin) achieves an appreciable improvement of the indured cells, since, as has been explained previously, the emulsified epicutaneous layer is increased, thus giving the epidermis greater elasticity, plasticity and smoothness. Due to its continuous micromassage effect and increase in local temperature which irradiates heat towards the deep hypodermic planes, a micromization of the inflitrates and an acceleration of the interchanges between the cutaneous and the muscular surfaces can be produced due to a greater lymphatic and venous contribution, thus enhancing reabsorption.

As this fact has already been verified experimentally in a large number of persons, there is no doubt whatsoever of the reduction produced by the adipose tissue stored in excess in specific parts of the body, prone to this accumulation of neutral fats (waist, abdomen and muscles). The action mechanism is fundamentally based on its hydrothermal effects (loss of water due to increase in the sweaty sebaceous secretion, due to the increase in local heat which causes a better blood circulation and reabsorption of fatty substances) and quinesiotherapeutic effects (constant and progressive micromassages, which potentializes the former effects and gives rise to a consumption of fats due to an increase in the muscular caloric necessities of being continuously and smoothly contracting).

Due to its continuous, smooth and elastic pressure characteristics, enhancing return circulation and avoiding edema it is believed that the turbo means can have a wide field in ANGIOLOGY for the curing, treatment and prevention of varix.

A large number of models can be used in orthopaedics for various parts of the body, since their resistance, elasticity and uniform pressure characteristics, besides their hydrothermal effects, confer thereto a high degree of postural correction, slowly and comfortably reducing the changes and deformations of the vertebrae or articulars.

What has just been said can be applied to the working and athletic field, both preventively, to avoid twistings, sprains, torn ligaments, etc., since the garments contemplated by the present invention increase the resistance of the skeleton (muscles and ligaments) supporting elements, they potentialize the muscular contractibility and the elasticity of the ligaments, enhancing a better recovery after stretchings, which aids a lesser effort, a higher yield and a lower injury index, as well as therapeutically, since its hydrothermal effect enchances reabsorption of seroses or hematic extrabasations, produces an anti-inflammatory action (heat) and maintains a correct posture of the affected part. These facts are medically well known to all.

As a final point, benefits from the use of a suitable garment having the characteristics mentioned above for pregnant women are possible.

The garment was used by four pregnant women (two of which were pregnant for six months, one for seven and one for eight months). A remarkable benefit with regard to comfort, rest, less tiredness and in one of them a better aspect in her abdominal cutaneous surface after pregnancy than in others who did not use any garment of this type and in whom stretched striae appeared, was achieved.

With reference to the properties of the laminated elastic garments of the invention, having continuous uniform pressure and a perfect adaptation to any surface, hydrothermal effect and "supporting" effect on the parts floating in empty spaces of the body, it can perfectly be understood that a pregnant woman maintains a more correct postural position of her vertebral column, and finds a supporting point and potentializes the resistance of the ligament, the heavy abdominal feeling diminishes when an elastic stress field exists, irradiated in all paths, which is maintained by the smooth and uniform pressure of the garment, without modifying the internal elements nor affecting in the least the movements of the fetus (the lines of force are compensated, in the various pressure points by enlarging the rubber plates). On the contrary the invention helps in normal adjustment during pregnancy, and helps the abdominal muscles to maintain a functional tone not allowing brusque expansions nor exaggerated stretchings of the cutaneous surface, whereby rupture of the dermic elastic fibers in persons prone to the same and the formation of unaesthetic abdominal "striae" produced in these cases by the mechanical effect of forced stretching are avoided, without having time for a slow elongation with adaptation of the fibers of the connective tissue to the new state.

I claim:

1. A quinohydrothermic body covering element comprising:

a stratified element including:

a thin layer of rubber material having opposite surfaces, said rubber layer being non-porous and highly elastic, said rubber layer having a thickness progressively decreasing from a maximum at one dimensional extremity thereof to a minimum at a second opposite dimensional extremity thereof; and a layer of knitted fabric material having opposite surfaces, one of which covers one of said surfaces of said rubber layer, the other of said surfaces of said fabric layer having extending therefrom a plurality of substantially parallel ribs, said ribs forming channel means for the circulation of air longitudinally of said element when said element is positioned on the person of a user.

2. An element as claimed in claim 1, wherein said fabric layer is substantially tubular in shape with a relatively smaller opening at a first end thereof and a relatively larger opening at a second end thereof, said ribs being on the inner surface of said tubular fabric layer, said ribs extending in substantially the axial direction of said tubular fabric layer; and wherein said rubber layer is substantially tubular in shape and surrounds the outer surface of said tubular fabric layer.

3. An element as claimed in claim 2, wherein said tubular rubber layer has said maximum thickness thereof at the end thereof adjacent said first end and said minimum thickness thereof at the end thereof adjacent said second end.

4. An element as claimed in claim 2, wherein said tubular fabric layer is seamless.

5. An element as claimed in claim 1, wherein said fabric layer is in the form of an elongate strip, said ribs extending transverse to the longitudinal dimension of said strip.

6. An element as claimed in claim 5, wherein said maximum thickness of said rubber layer is adjacent one longitudinal extremity of said strip, and said minimum thickness of said rubber layer is adjacent the opposite longitudinal extremity of said strip.

* * * * *